(12) United States Patent
Songkakul

(10) Patent No.: US 9,690,266 B2
(45) Date of Patent: Jun. 27, 2017

(54) BUILDING AUTOMATION SYSTEM CONTROL WITH MOTION SENSING

(75) Inventor: Pornsak Songkakul, Mequon, WI (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 750 days.

(21) Appl. No.: 13/236,258

(22) Filed: Sep. 19, 2011

(65) Prior Publication Data
US 2013/0073093 A1  Mar. 21, 2013

(51) Int. Cl.
*G05B 15/02* (2006.01)

(52) U.S. Cl.
CPC .... *G05B 15/02* (2013.01); *G05B 2219/25011* (2013.01)

(58) Field of Classification Search
USPC .......................... 700/276, 277, 278, 282, 300
See application file for complete search history.

(56) References Cited

U.S. PATENT DOCUMENTS

| | | | | |
|---|---|---|---|---|
| 5,395,042 A * | 3/1995 | Riley | ................... | F24F 11/0009 165/237 |
| 6,909,921 B1 | 6/2005 | Bilger | | |
| RE44,146 E * | 4/2013 | Bagwell | ................... | B08B 15/00 165/237 |
| 2002/0166659 A1* | 11/2002 | Wagner | ................ | F24F 11/0012 165/254 |
| 2003/0096572 A1* | 5/2003 | Gutta | ................... | F24F 11/0034 454/229 |
| 2007/0157630 A1* | 7/2007 | Kadle | ................. | B60H 1/00285 62/3.3 |
| 2008/0244104 A1* | 10/2008 | Clemente | ........................ | 710/11 |
| 2009/0149973 A1 | 6/2009 | Keller et al. | | |
| 2010/0019050 A1* | 1/2010 | Han | .................... | B60H 1/00642 236/44 C |
| 2010/0025483 A1 | 2/2010 | Hoeynck et al. | | |
| 2010/0262298 A1* | 10/2010 | Johnson | ................. | F24F 11/001 700/277 |
| 2011/0066302 A1* | 3/2011 | McEwan | ....................... | 700/295 |
| 2011/0115910 A1 | 5/2011 | Brackney | | |
| 2011/0127340 A1* | 6/2011 | Aiken | .................. | F24F 11/0001 236/49.3 |

(Continued)

FOREIGN PATENT DOCUMENTS

CN          102132223 A          7/2011

OTHER PUBLICATIONS

Olesen, B. W. and G.S. Brager, 2004. A Better Way to Predict Comfort: The New ASHRAE Standard 55-2004. ASHRAE Journal, August.*

(Continued)

*Primary Examiner* — Christopher E Everett

(57) ABSTRACT

An arrangement configured to control an environmental parameter in a building space includes a building automation system. The building automation system includes a plurality of field devices configured to control the environmental parameter within the building space. The arrangement further includes a motion detector configured to determine a number of humans within the building space and a measure of movement for the number of humans. The building automation system is configured to control the field devices based at least in part on the determined number of humans and the measure of movement for the number of humans.

21 Claims, 5 Drawing Sheets

(56) References Cited

U.S. PATENT DOCUMENTS

| | | | | |
|---|---|---|---|---|
| 2011/0183754 A1* | 7/2011 | Alghamdi | ............... | A63F 13/65 |
| | | | | 463/31 |
| 2011/0187812 A1* | 8/2011 | Sankai | ..................... | A61B 5/01 |
| | | | | 348/14.08 |
| 2011/0205371 A1* | 8/2011 | Nagata | ................... | G06T 7/194 |
| | | | | 348/207.1 |
| 2011/0251725 A1* | 10/2011 | Chan | .................. | H05B 37/0227 |
| | | | | 700/277 |

OTHER PUBLICATIONS

Fountain, M.E. and C. Huizenga, 1997. A thermal sensation prediction software tool for use by the profession. ASHRAE Transactions, vol. 103, Pt. 2.*

PCT Search Report dated Apr. 24, 2013, for application No. PCT/US2012/055879. (9 pages).

* cited by examiner

BUILDING AUTOMATION SYSTEM CONTROL WITH MOTION SENSING

FIELD

This application relates to the field of building systems and, more particularly, to the control of environmental conditions within a building.

BACKGROUND

Building automation systems encompass a wide variety of systems that aid in the monitoring and control of various aspects of building operation. Building automation systems include security systems, fire safety systems, lighting systems, and heating, ventilation, and air conditioning ("HVAC") systems. Lighting systems and HVAC systems are sometimes referred to as "environmental control systems" because these systems control the environmental conditions within the building.

The elements of a building automation system are widely dispersed throughout a facility. For example, a HVAC system includes temperature sensors and ventilation damper controls as well as other elements that are located in virtually every area of a facility. These building automation systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc. Building Technologies Division of Buffalo Grove, Ill. ("Siemens"), which may be used with the model Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes parameters such as temperature and otherwise, set port changes, modify a control program, or the like.

The central control station and field panels are in communication with various field devices (the outputs and inputs of which are typically monitored and controlled as "points"). "Field devices" are devices which are operative to measure, monitor, and/or control various building automation system parameters. Example field devices include lights, thermostats, temperature sensors, damper actuators, alarms, HVAC devices, and numerous other field devices as will be recognized by those of ordinary skill in the art. The field devices are in communication with and receive control signals from (and/or send signals to) subsystem controllers, the central control station and/or field panels of the building automation system. Accordingly, building automation systems are able to control various aspects of building operation by controlling and monitoring the field devices.

Buildings utilizing building automation systems typically have numerous field devices that are used for environmental control purposes. These field devices may also be referred to herein as "environmental control devices". Examples of environmental control devices include thermostats, damper actuators, fans, lights, heaters, and various other devices known to those of ordinary skill in the art. These devices are typically controlled by the building automation system based on conventional parameters, such as a thermostat setting and the sensed temperature or humidity in a room.

Traditional building automation systems monitor the temperature in a room and strive to maintain that temperature at some predetermined level (e.g., as defined by the user at a thermostat). In order to do this, the temperature control system must deliver sufficient cooling and heating to match the actual heat generation in the room, thus resulting in a constant temperature. The actual heat generation in the room is based on a number of factors including the number of occupants in the room, heat generation from physical activities (i.e., sit, stand, walk, run, etc), and heat from other sources within the room such as lighting or equipment, air flow within the room, and various other factors.

Maintaining the temperature in a room at a predetermined level is often sufficient to provide an acceptable comfort level in a room. However, in some situations, the desired temperature in the room may change depending on various factors, such as the actions occurring within the room. For example, an individual that is exercising may prefer the temperature a few degrees cooler than when sitting and reading the paper. In this situation, the individual may temporarily changes the thermostat setting during the exercise time.

While conventional methods for human interaction with a building automation system have been adequate, it would be advantageous to further automate building automation systems to provide comfort control for a space related to the amount of human activity in the space. In particular, it would be advantageous to reduce the required amount of human interaction with the building automation system while still allowing the building automation system to deliver desirable environment conditions for individuals within the building, even if those desired environmental conditions change over time.

SUMMARY

In accordance with one embodiment of the disclosure, there is provided an arrangement configured to control an environmental parameter in a building space. The arrangement comprises a building automation system including a plurality of field devices configured to control the environmental parameter within the building space. The arrangement further comprises a motion detector configured to determine a number of humans within the building space and a measure of movement for the number of humans. The building automation system is configured to control the field devices based at least in part on the determined number of humans and the measure of movement for the number of humans.

Pursuant to another embodiment of the disclosure, a method of controlling an environmental parameter in a building space includes determining a number of humans in the building space and determining measure of movement of the number of humans in the building space. The method further includes controlling the operation of at least one field device of a building automation system based at least in part on the determined number of humans in the building space and the determined measure of movement of the number of humans in the building space.

In accordance with yet another embodiment of the disclosure, a control system for a building includes a motion detector configured to determine a number of humans and a measure of movement for the number of humans in a room of the building. A field device is configured to control a flow of air into the room of the building. A controller is configured to send control signals to the field device based at least in part on the number of humans and the measure of movement of the number of humans determined by the motion detector.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
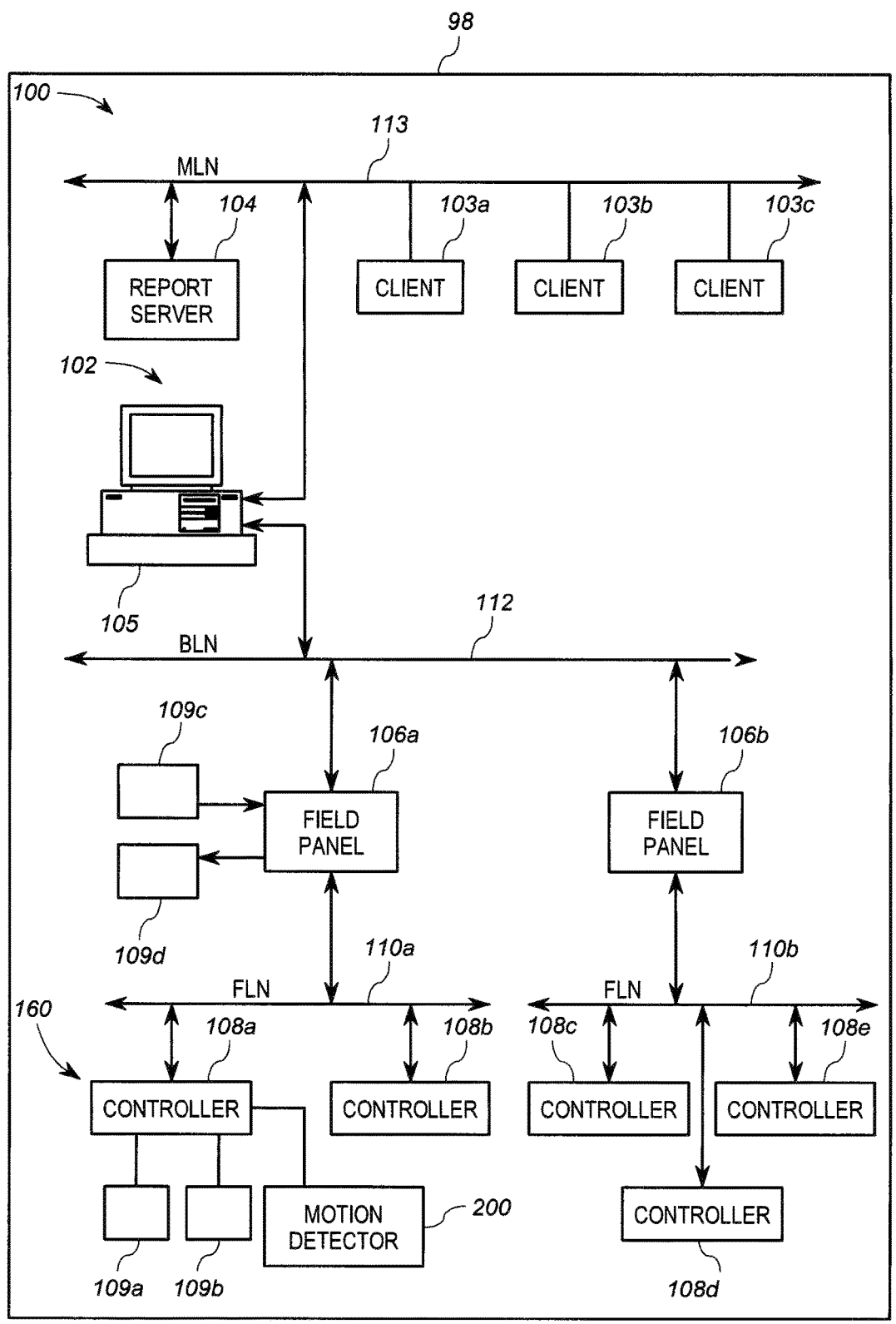
FIG. 1 is an exemplary topology diagram for a building automation system consistent with the present invention.

With reference to FIG. 1, an arrangement for controlling an environmental condition in a building 98 includes a building automation system 100. The building automation system includes a plurality of field devices 109a-109d which are configured to monitor and control an environmental parameter in a plurality of different rooms in the building. A motion detector 200 is also coupled to the building automation system 100. As explained in further detail below, the motion detector 200 is configured to determine a number of humans within a room of the building 98. The motion detector is also configured to determine a measure of movement for each of the humans in the room. The building automation system 100 is designed to control the field devices based at least in part on the determined number of humans and the measure of movement for the number of humans.

Building Automation System

With continued reference to FIG. 1, a block diagram depicts an exemplary building automation system (BAS) 100 provided within a building 98. The building automation system 100 is an environmental control system configured to control at least one of a plurality of environmental parameters within the building including, for example, temperature, humidity and/or lighting. An example of a BAS is the Apogee® building automation system available from Siemens. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

In the exemplary arrangement of FIG. 1, the building automation system 100 includes a supervisory control system or workstation 102, client workstations 103a-103c, a report server 104, a plurality of field panels represented by field panels 106a and 106b, a plurality of controllers represented by controllers 108a-108e, and a plurality of field devices represented by devices 109a-109d. It will be appreciated, however, that wide varieties of BAS architectures may be employed.

Each of the controllers 108a-108e represents one of plurality of localized, standard building automation subsystems, such as building space temperature control subsystems, lighting control subsystems, or the like. Suitable controllers for building automation subsystems include, for example, the model TEC (Terminal Equipment Controller) available from Siemens. To carry out control of its associated subsystem, each controller 108a-108e connects to one or more field devices, such as sensors or actuators, shown by way of example in FIG. 1 as the sensor 109a and the actuator 109b connected to the controller 108a.

Typically, a controller such as the controller 108a effects control of a subsystem based on sensed conditions and desired set point conditions. The controller controls the operation of one or more field devices 109a and 109b to attempt to bring the sensed condition to the desired set point condition. By way of example, consider temperature control subsystem 160 in FIG. 1 that is controlled by the controller 108a, where the field device 109b is a damper actuator connected to an air conditioning damper in an air duct (not shown in FIG. 1) and the field device 109a is a room temperature sensor. If the sensed temperature in the room as provided by the sensor 109a is not equal to a desired temperature set point, then the controller 108a may send control signals to the damper actuator 109b to cause the actuator 109b to further open or close the damper. The position of the damper controls the air flow through the air duct and into the room. Thus, by controlling the damper actuator 109b, the controller 108a attempts to bring the temperature in the room closer to the desired set point. It is noted that in the BAS 100, sensor, actuator and set point information may be shared between the controllers 108a-108e, the field panels 106a-106b, the work station 102 and any other elements on or connected to the BAS 100.

In the embodiment of FIG. 1, the motion detector 200 is coupled to the controller 108a as part of the temperature control subsystem 160. As explained in further detail below, the motion detector 200 is configured to determine information related to human activity within a room of the building. The motion detector 200 provides this human activity information to the controller 108a. The controller 108a then controls the associated field devices for the temperature control system 160 (e.g., damper actuator 109b) based in part on the information provided by the motion sensor 200.

With continued reference to FIG. 1, in order to facilitate the sharing of information between subsystems, groups of subsystems such as the subsystems connected to controllers 108a and 108b are typically organized into floor level networks or field level networks ("FLNs") and generally interface to a field panel (e.g., field panel 106a). The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the workstation 102 and the report server 104. The field panels 106a and 106b thereby coordinate the communication of data and control signals between the subsystems associated with the controllers 108a-108e and the supervisory computer 102 and report server 104. In addition, one or more of the field panels 106a, 106b may themselves be in direct communication with and control field devices, such as ventilation damper controllers or the like. To this end, as shown in FIG. 1, the field panel 106a is operably connected to one or more field devices, shown for example as a sensor 109c and an actuator 109d.

The workstation 102 provides overall control and monitoring of the building automation system 100 and includes a user interface. The workstation 102 further operates as a BAS data server that exchanges data with various elements of the BAS 100. The BAS data server can also exchange data with the report server 104. The BAS data server 102 allows access to the BAS system data by various applications. Such applications may be executed on the workstation 102 or other supervisory computers, not shown.

The workstation 102 is operative to accept modifications, changes, alterations and/or the like from the user. This is typically accomplished via a user interface 105 for or of the computer 102. The user interface may include a keyboard, touchscreen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The management level network (MLN) 113 may connect to other supervisory computers, Internet gateways, or other gateways to other external devices, as well as to additional network managers (which in turn connect to more subsystems via additional low level data networks). The supervisory computer 102 uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

Figure 2A:
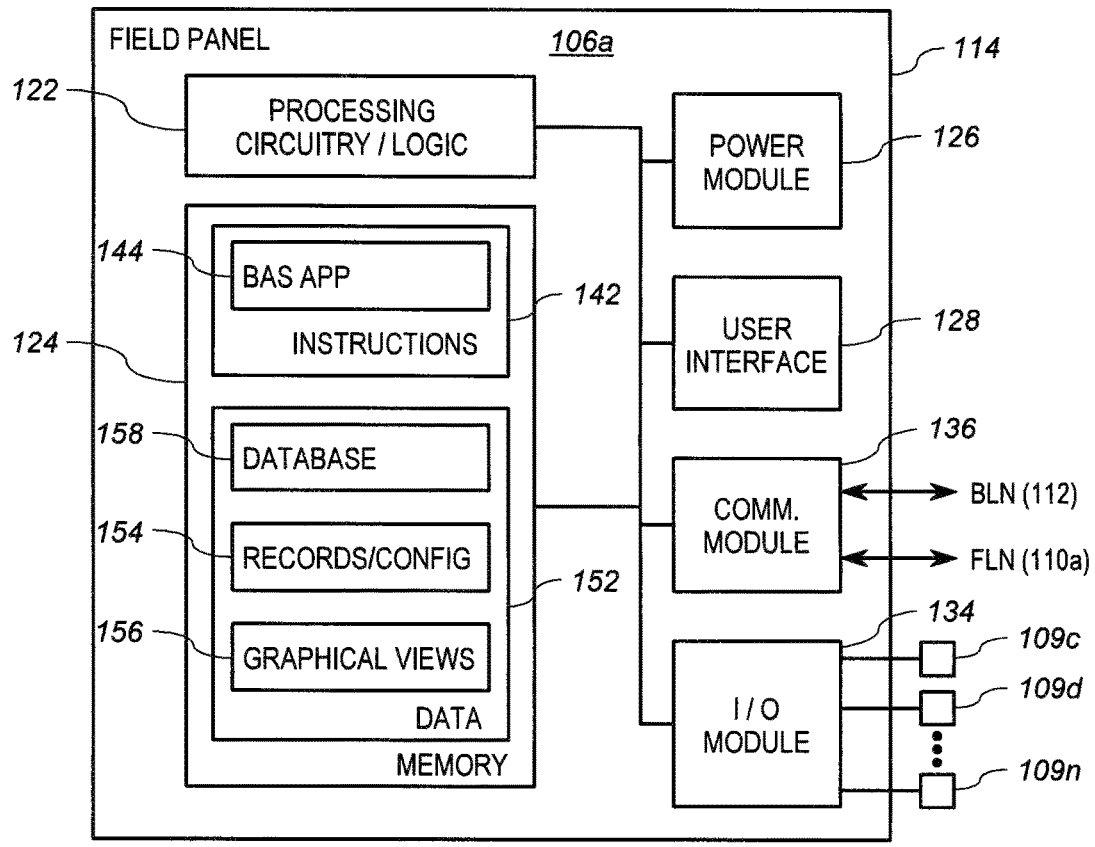
FIGS. 2A and 2B depict an exemplary internal block diagram of a field panel and controller of the building automation system of FIG. 1.
Figure 2B:
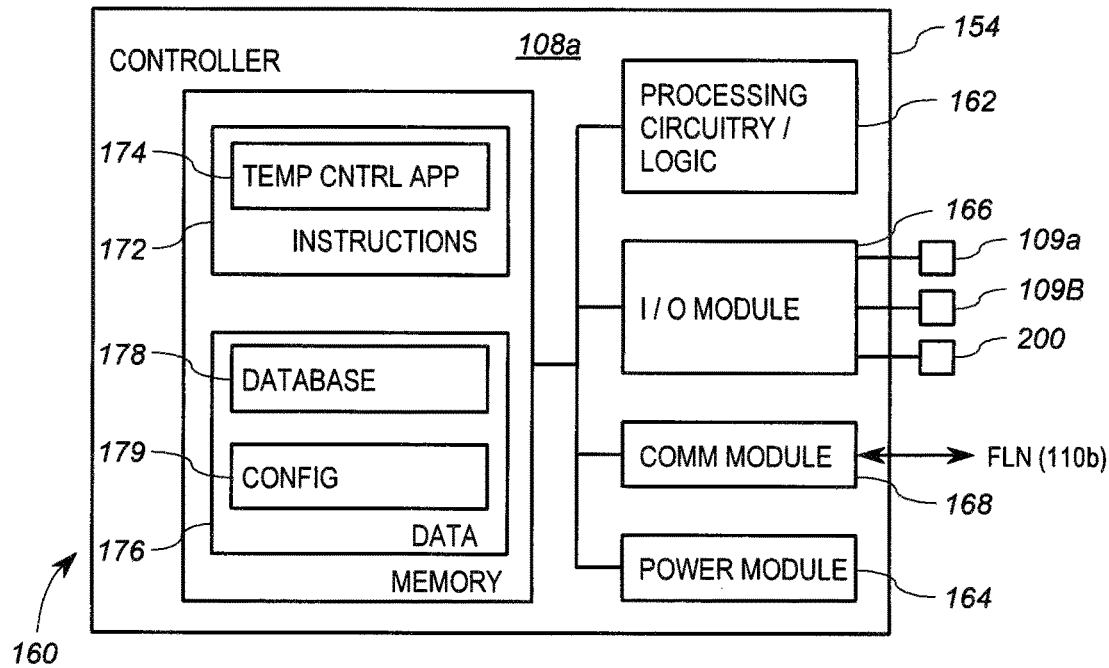

With reference now to FIGS. 2A and 2B, an internal functional block diagram of an exemplary embodiment of the field panel 106a and the controller 108a for the temperature control subsystem 160 is shown. It should be appreciated that the embodiment of the field panel 106a and the controller 108a is only one many possible embodiments of field panel and temperature control subsystem consistent with the present invention as described herein. For example, in at least one alternative embodiment, the functions of the controller 108a of the temperature control subsystem 160 may be provided by the field panel 106a without the need for the controller 108a. As such, the exemplary embodiment of the field panel 106a and controller 108a of FIGS. 2A and 2B represent all manners or configurations of field panels that are operative in the manner set forth herein.

The field panel 106a of FIG. 2A includes a housing, cabinet or the like 114 that is configured in a typical manner for a building automation system field panel. The field panel 106a includes processing circuitry/logic 122, memory 124, a power module 126, a user interface 128, an I/O module 134, and a BAS network communications module 136.

The processing circuitry/logic 122 is operative, configured and/or adapted to operate the field panel 106a including the features, functionality, characteristics and/or the like as described herein. To this end, the processing circuit 122 is operably connected to all of the elements of the field panel 106a described below. The processing circuitry/logic 122 typically executes or is under the control of program instructions or programming software or firmware 142 contained in memory 124, and particularly BAS application software. In addition to storing the instructions 142, the memory also stores data 152 for use by the BAS 100. The data 152 may include, for example, various records and configuration files 154, graphical views 156, and one or more databases 158 containing information for use by the BAS 100.

Execution of the BAS application 144 by the processor 122 results in control signals being sent to the field devices 109c to 109n via the I/O module 134 of the field panel 106a. Execution of the BAS application 144 also results in the processor 122 receiving status signals and other data signals from various field devices 109n, and storage of associated data in the memory 124. In one embodiment, the BAS application 144 may be provided by the Apogee® Insight® BAS control software commercially available from Siemens Industry, Inc. or another BAS control software.

With continued reference to FIG. 2A, the field panel 106a further includes a power module 126 that is operative, adapted and/or configured to supply appropriate electricity to the field panel 106a (i.e. the various components of the field panel). The power module 126 may operate on standard 120 volt AC electricity, but may alternatively operate on other AC voltages or include DC power supplied by a battery or batteries.

An input/output (I/O) module 134 is also provided in the field panel 106a. The I/O module 134 includes one or more input/output circuits that communicate directly with devices such as actuators and sensors. Thus, for example, the I/O module 134 includes analog input circuitry for receiving analog sensor signals from a sensor 109c, and includes analog output circuitry for providing analog actuator signals to an actuator 109d. The I/O module 134 typically includes several of such input and output circuits.

The field panel 106a further includes a BAS network communication module 136. The network communication module 136 allows for communication to the controllers 108a and 108b as well as other components on the FLN 110a, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106a may be accessed locally. To facilitate local access, the field panel 106a includes an interactive user interface 128. Using interface 128, the user may control the collection of data from devices such as sensor 109c and actuator 109d. The user interface 128 of the field panel 106a includes devices that display data and receive input data. These devices may be devices that are permanently affixed to the field panel 106a or portable and moveable. The user interface 128 may suitably include an LCD type screen or the like, and a keypad. The user interface 128 is operative, configured and/or adapted to both alter and show information regarding the field panel 106a, such as status information, and/or other data pertaining to the operation, function and/or modifications or changes to the field panel 106a.

With reference to FIG. 2B, the controller 108a is in communication with the field panel 106a via the FLN 110b. The controller 108a is positioned in or in close proximity to a room of the building where temperature or another environmental parameter will be controlled with the controller 108a. The controller 108a includes a housing cabinet or the like 154 that is configured in a typical manner for a building automation system field panel. The controller 106a includes processing circuitry/logic 162, a power module 164, an I/O module 166, an FLN network communications module 168, and a memory 170.

The processing circuitry/logic 162 is operative, configured and/or adapted to operate the controller 108a including the features, functionality, characteristics and/or the like as described herein. To this end, the processing circuit 162 is operably connected to all of the elements of the controller 108a described below. The processing circuitry/logic 162 executes or is under the control of program instructions or programming software or firmware 172 contained in memory 170, such as temperature control application 174. The temperature control application 174 is configured to control and process data from all components of the temperature control system 160, including the temperature sensor 109a, damper actuator 109b, motion detector 200, and various other field devices. In addition to storing the instructions 172, the memory also stores data 176 for use by the temperature control subsystem 160. The data 176 may include data stored in a database 178, configuration files 179, or data stored in various other formats.

Execution of the temperature control application 174 by the processor 162 results in control signals being sent to the field devices (including damper actuator 109b and various other field devices not shown in FIG. 2B) via the I/O module 166 of the controller 108a. Execution of the temperature control application 174 also results in the processor 162 receiving status signals and other data signals from various field devices (including temperature sensor 109a, motion detector 200, and various other field devices not shown in FIG. 2B). Data from the temperature sensor 109a, motion detector 200, and other field devices may be stored in the memory 170.

The controller 108a further includes a power module 164 that is operative, adapted and/or configured to supply appropriate electricity to the various components of the controller 108a. The power module 126 may operate on standard 120 volt AC electricity, but may alternatively operate on other AC voltages or include DC power supplied by a battery or batteries.

An input/output (I/O) module 166 is also provided in the controller 108a. The I/O module 166 includes one or more input/output circuits that communicate directly with field devices such as actuators and sensors. Thus, for example, the I/O module 166 includes analog input circuitry for receiving analog sensor signals from the temperature sensor 109a, and includes analog output circuitry for providing analog actuator signals to the actuator 109b.

The controller 108a further includes an FLN network communication module 168. The network communication module 168 allows for communication to the field panels 106a and other components on the FLN 110a.

Motion Detector

Figure 3:
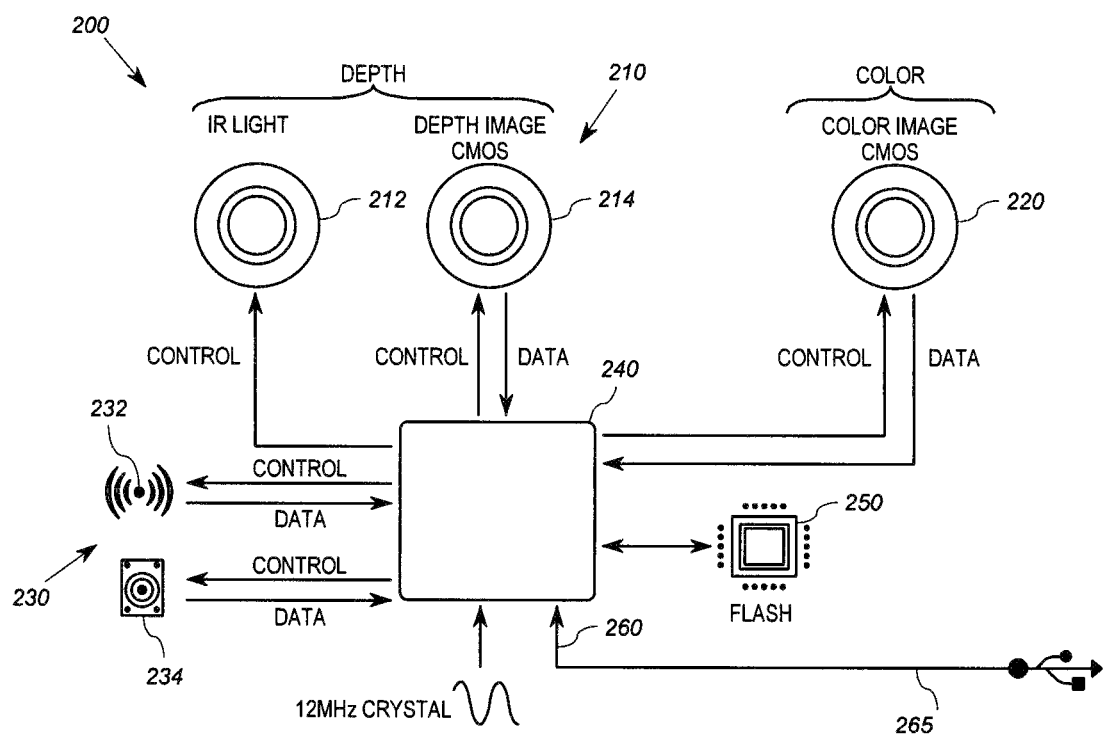
FIG. 3 is a diagram of an exemplary motion detector coupled to the building automation system of FIG. 1.

With reference now to FIG. 3 an exemplary motion detector 200 is shown for use with the BAS of FIG. 1. In the embodiment of FIG. 3, the motion detector 200 includes a depth sensor 210, a camera 220, one or more audio devices 230, a motion sensing processor 240 (which may also be referred to herein as a "motion sensing chip"), a memory 250, and a data port 260. The motion detector 200 in FIG. 3 is configured to interpret 3D scene information from a continuously-projected infrared structured light.

The depth sensor 210 is configured to determine a human target's distance from the sensor 210 and replicate movements of the human. The depth sensor 210 includes an infrared laser projector 212 and a monochrome CMOS sensor 214. The infrared laser projector 212 emits infrared light into the room which is reflected off of humans and back to the CMOS sensor 214. The reflected infrared light allows the CMOS sensor to capture video data under any of various ambient light conditions. The range of the depth sensor 210 is adjustable depending on the power of the infrared laser projector 212 and the sensitivity of the CMOS sensor 214. The depth sensor 210 may be automatically calibrated based on the physical size of the room, the environment in the room (e.g., light conditions), furniture or other obstacles in the room, or other considerations. Electrical signals from the monochrome CMOS sensor 214 are delivered to the motion sensing chip 240 for data processing.

The camera 220 is a RGB camera capable of producing a video data stream. The RGB camera 220 captures images through three basic color components (i.e., red, green, and blue). Accordingly, an array of three independent CMOS sensors may be used in the camera 220 to capture each respective color of light and convert it into associated electrical signals. The RGB camera 220 may also be automatically calibrated based on the physical size of the room, the environment in the room (e.g., light conditions), furniture or other obstacles in the room, or other considerations. Electrical signals from the RGB camera 220 are delivered to the motion sensing chip 240 for data processing.

The audio devices 230 may include one or more microphones 232 and or speakers 234 provided to capture audio and deliver audio within the building space. The audio signals captured by the microphone 232 may be used for various purposes, as may be recognized by those of ordinary skill in the art. For example, the audio device may be used to detect noise patters that suggest whether a fan or other field device is on, and the status of the fan could be provided to the BAS 100. In other embodiments, the audio devices 230 may serve to allow speech commands to the BAS 100 and deliver audio signals. To this end, the audio devices 230 may include echo cancellation, noise suppression and localization, and various other features. In yet additional embodiments, the audio devices 230 may deliver audio signals that may be used by the controller 108a to help recognize the existence of certain individuals in the room or determine an activity level in the room. To this end, the controller 108a may be equipped with speech recognition software, such as DRAGON Naturally Speaking sold by Nuance Communications, Inc.

The motion sensing chip 240 is a microprocessor configured to receive data from the depth sensor 210, camera 220, and other components of the motion detector (e.g., the microphone 230) and interpret the data to determine various motion-related variables within the space. For example, using the combined video inputs from the depth sensor 210 and the camera 220, the motion sensing chip 240 may determine a number of human occupants within the building space (e.g., the number of humans in a room of a building) and a measure of movement for each human (e.g., a rate of movement for the human). The measure of movement may be derived by the motion detector 200 by taking a frame-to-frame assessment of each human, and providing a resulting measurement such as movements per frame, movements per second, distance of movement over time, etc). Off the shelf products with motion sensing chips capable of performing these tasks are commercially available from various sources, such as the KINECT™ motion sensing device offered by Microsoft Corporation in association with the XBOX 360™ video game console, and the Xtion Pro™ motion sensing device offered by ASUS. These products include motion sensing chips and various other motion sensing components, such as those described above in association with FIG. 3, and are capable of providing data signals indicative of human activity within a building space. These data signals may provide data related to the number of humans within a building space, and a measure of movement for each human within the building space. In addition, the data signals may provide data related to the spacing between the humans within the building space, a sub-portion of a building space where the humans are concentrated or located, as well as various other signals as will be recognized by those of ordinary skill in the art.

Various motion sensing technologies and techniques may be used by the motion sensing chip 240 in order to determine the number of humans within the building space and the measure of movement for each human within the building space. One known method for monitoring human movement involves skeletal full body tracking which monitors body joint angles. According to this method, body parts between joints are simplified into straight line portions (or vectors), such that the each human is represented in a stick figure form. The method involves first recognizing human forms in order to identify human figures within the building space. After recognizing the existence of humans, the method involves tracking the movement of each figure's body parts over time. In one such embodiment, a rate of movement may be determined by analyzing vector movement over time. Movement of the vectors may be relative to a joint position or a human midpoint value. Scalar movement may be analyzed over time (or per frame), such that a number of movements over time (or per frame) is calculated.

In addition to the motion detector 200 being configured to detect the number of humans and a measure of movement for each human within a building space, the motion detector 200 may also be able to determine spacing between individuals. The method for determining spacing may be employed by the motion detector 200 and involve the use of the depth sensor 210 to determine the distance of each human form from the motion sensor and spacing of the individuals can be calculated using this data. The depth sensor 210 or camera 220 may provide further data on the lateral spacing between individuals within the building space.

Data generated by the motion sensing chip 240, including calculations of the total number of humans in a room, the measure of movement of each human, and spacing between humans may be temporarily stored in the memory 250. The memory 250 may take any of various forms, such as a flash memory. The memory 250 may also be used to store instructions for controlling the various devices of the motion sensor 200 and instructions for the motion sensing chip 240 for processing the data received from the depth sensor 210 and RGB camera 220.

The collection of data generated by the motion sensing chip 240, including calculations of the total number of humans in a room, the measure of movement of each human, and/or the spacing between humans may also be delivered to the controller 108a via a port 260 (see FIG. 3). A data cable 265 may be coupled to the data port 260 and extend to the controller 108a. The data cable 265 may be, for example, a USB cable or other data cable. In lieu of a wired data connection using data cable 265, the motion controller 200 may include a wireless transceiver (not shown) such that data communications between the motion detector 200 and the controller 108a may be accomplished wirelessly.

In at least one embodiment, the data cable 265 also delivers power to the motion detector 200. In such an embodiment, the data cable 265 may be a USB cable. In lieu of or in addition to power being delivered by the data cable 265, power may also be delivered by a designated power cable or battery power system (not shown in FIG. 3).

The controller 108a is configured to process the collection of data received from the motion detector 200 in order to determine additional information about the humans within the building space. In particular, the controller 108a is configured to determine an activity level for each human based on the measurement of movement data provided by the motion detector 200. In one embodiment, the controller 108a determines an activity level for each human by tracking movements over a predetermined period of time (or number of frames) to arrive at a rate of movement. The controller 108a then categorizes each human into one of a finite number of activity levels based on the rate of movement. For example, the controller 108a may collect data from the motion detector 200 over a short period of time, such as five seconds. Based on the number of movements within the five second period, the controller 108a may then associate the human with one of four different activity levels. In this embodiment, the four activity levels include "0" representing no activity, "1" representing low activity, "2" representing medium activity, and "3" representing high activity. A human may be assigned a "0" activity level when no movements are determined by the controller over the five second period. The human may be assigned a "1" activity level when one to ten movements are determined by the controller over the five second period. The human may be assigned a "2" activity level when eleven to twenty movements are determined by the controller over the five second period. The human may be assigned a "3" activity level when over twenty movements are determined by the controller over the five second period. Accordingly, the controller is configured to assign an activity level to each human. While the foregoing is one exemplary description of a method for determining activity level, it will be recognized that numerous other methods for determining activity level are possible without departing from the scope of the present invention.

BAS Control Using Motion Detector

Figure 4:
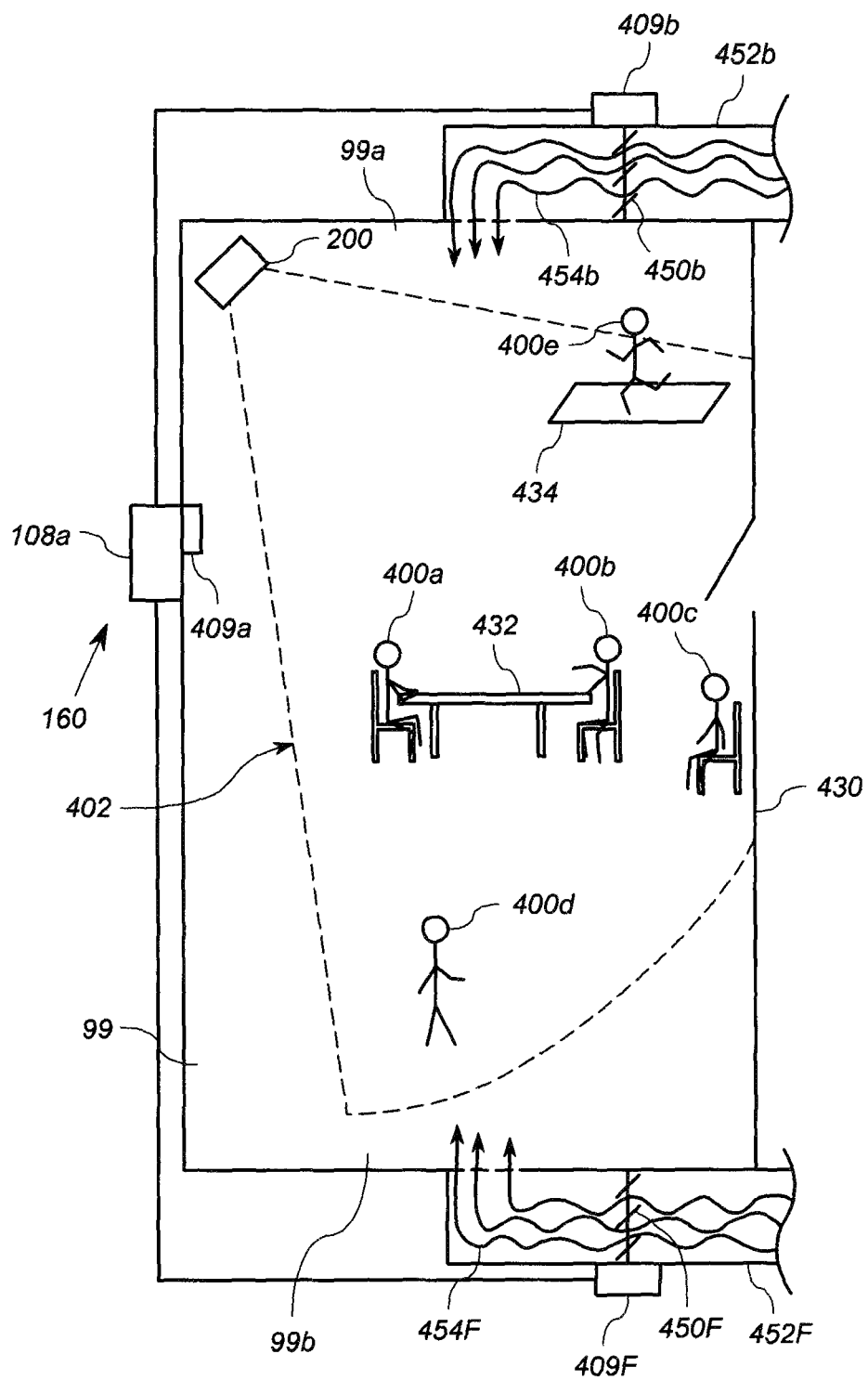
FIG. 4 is an illustration of humans located within a building space monitored by the motion detector of FIG. 3.

With reference now to FIG. 4 a motion detector 200 is shown in association with a building space 99, such as a conference room 99 within an office building. A plurality of humans 400a-400e are present within the building space 99. In the example of FIG. 4, a total of five humans are present within the building space 99, with each of the humans represented in stick figure form in FIG. 4. The motion detector 200 has a field of view/range 402 (represented by dotted lines in FIG. 4) which preferably covers most or all of the space within the room which may be occupied by humans. The range of the motion detector defines a conical space 402 that is limited by physical boundaries within the room, such as walls 430, floors, and furniture 432. The motion detector 200 is positioned at the vertex of this conical space. A typical commercially available motion detector 200 may cover a range that extends about 12 feet to about 20 feet from the motion detector, has an aperture of about 60°, and covers a floor space of about 200 ft². As discussed previously, the motion detector 200 is equipped with various components that provide for the monitoring of human activity within the building space. In particular, the motion detector 200 is configured to use the depth sensor 210, camera 220, and other components to identify the presence of humans within the building space 99, determine the total number of humans within the building space 99, and track their activity.

While it may be advantageous to cover most of the space of a room with a single motion detector 200, in many embodiments the range of the motion detector 200 may only cover a portion of a room that is substantially less than the entire room. In such embodiments, multiple motion detectors may be used to cover substantially all of a room. For example, a first motion detector 200 could be used to cover the right half of a room, and a second motion detector could be used to cover the left half of a room. In other embodiments, a first motion detector may be used to cover substantially all of a room, while a second motion detector may be used to cover a small portion of the room that is blocked from the first motion detector by some partition (e.g., furniture 432 or other partition not shown in FIG. 4). In these embodiments, it is typically advantageous to configure the motion detectors in a way that limits the amount of overlapping ranges. Accordingly, one of the motion detectors may be focused and configured to cover only a limited span and depth. In other embodiments, it may be determined that a motion detector 200 should only cover a small portion of a room while other portions of the room remain uncovered. Thus, it will be recognized that in some embodiments, it may be desirable to limit the coverage of the motion detector 200 such that the building space monitored is only a sub-portion of a room (e.g., the range of the motion detector covers 75%, 50%, 25% or less of the entire space in a room that may be normally occupied by humans).

With continued reference to FIG. 4, the environmental conditions in the building space 99 are controlled by a plurality of field devices. In the embodiment of FIG. 4, the field devices include a temperature sensor 409a configured to measure the air temperature in the room, and a damper actuator 409b configured to control a damper 450b in an air duct 452b that is configured to deliver a flow of air 454b to the building space 99. The motion detector 200 and field devices 409a and 409b are provided as part of an environmental control system of a BCS. Accordingly, the motion detector 200 and field devices 409a and 409b are in communication with a controller 108a, a field panel 106a (not shown in FIG. 4) or other components of a BCS 100. While only one motion detector 200 and two field devices 409a and 409b are shown in the embodiment of FIG. 4, it will be recognized by those of ordinary skill in the art that the environmental control system may comprise numerous additional field devices, such as heaters, chillers, fans, lighting, or other field devices.

Based on the environmental conditions provided by the thermal control system 160, each individual in the room will have some level of comfort or discomfort. The term "thermal comfort level" refers to a state of mind in humans that expresses satisfaction or dissatisfaction with their surrounding environment. The thermal comfort level of each individual 400a-400e occupying the room 99 depends on a number of different factors. These factors include the actual temperature (and humidity) within the room. However, the comfort level of the individual is not limited to the actual temperature (and humidity) within the room. Additional factors that may determine the thermal comfort level of an individual include, for example, the total number of individuals occupying the room, the activity level of the individuals, the clothing worn by the individuals, and spacing between the individuals within the room 99.

FIG. 4 includes five individuals in the room 99. Three individuals 400a, 400b and 400c are seated. One individual 400d is standing and exhibiting some moderate level of physical activity (e.g., moving arms, head, etc.). One individual 400e is running on a treadmill 434. Assuming all of the individuals are wearing similar levels of clothing, it can be assumed that the seated individuals 400a, 400b and 400c would prefer the room to be slightly warmer than the individual 400e who is running on the treadmill. Relatively inactive individuals 400a-c may prefer the temperature to be 72° F., while the more active individual 400e running on the treadmill may prefer for the temperature to be 67° F. Depending on the actual temperature in the room, different individuals will register different thermal comfort levels. Thus, it can be seen that the thermal comfort level of distinct individuals in the room 99 will be different depending on a number of factors, including the activity level of each individual and the actual room temperature.

In the example of FIG. 4, if the actual room temperature is 72° F., the seated individuals 400a-c may find the temperature to be ideal, but the running individual 400e may find the temperature to be unacceptably hot. However, a slight change in the temperature could result in all persons in the room finding the temperature to be at a generally acceptable level. For example, if the temperature were dropped slightly to 70° F., the more sedentary individuals 400a-400c may find the room to be a bit cool, yet acceptable. At this temperature, the more active individual 400e may find the room to be a bit warm, yet acceptable. At the same time, the standing individual 400d that is exhibiting some moderate level of activity may find the temperature in the room to be perfectly comfortable. In this situation, even though some find the temperature to be slightly warm, and others find the temperature to be slightly cool, all individuals in the room find the temperature to be acceptable. The temperature control system 160 described herein makes use of the motion detector 200 in the room 99 to predict a collective thermal comfort level for all individuals in the room, and controls the environmental conditions (e.g., temperature) in the room such that the greatest number of individuals will find the environmental conditions within the room to be acceptable.

In order for the temperature control system 160 to control the temperature in the room 99 such that the greatest number of individuals finds the temperature to be acceptable, the temperature control system calculates an overall thermal comfort level for all individuals within the room. One method for predicting an overall thermal comfort level for humans within a building space is defined in ASHRAE Standard 55-1992. This standard uses a set of equations to arrive at a Predictive Mean Value (also referred to herein as "PMV") representative of the overall thermal comfort condition within a room. The PMV is an integer between −3 and 3 that predicts the thermal comfort level for most humans within the building space. A table of PMV values is as follows:

| PMV Value | Thermal Comfort Level |
|---|---|
| −3 | Extremely Cool/Cold |
| −2 | Moderately Cool |
| −1 | Slightly Cool |
| 0 | Neutral |
| 1 | Slightly Warm |
| 2 | Moderately Warm |
| 3 | Extremely Warm/Hot |

As noted in the above table, PMV is an index that predicts the mean value of the votes of a large group of persons on the 7-point thermal sensation scale based on the heat balance of a human body. Factors that affect the PMV are metabolic rate, clothing insulation, air temperature, mean radiant temperature, air speed and relative humidity.

A PMV equation provides a steady state model that can be calculated to provide a collective thermal comfort level for a particular building space. The PMV equation is a function of "thermal sensation" (also referred to herein as "TS") and "heat loss" (also referred to herein as "HL") of the occupants in the space. In other words, $$PMV = f(TS, HL). \quad \text{(equation 1)}$$

TS is a measure of the temperature that occupants perceive in the form of ASHRAE thermal sensation scale. TS is a function of the "metabolic rate" (also referred to herein as "MET") for each individual in the building space. In other words, $$TS_k = f(MET). \quad \text{(equation 2)}$$

MET is defined as heat production per unit area of skin. Metabolic rate of 1 met is equal to 18.4 Btu/h/Sq.Ft. (50 kCal/h/Sq. Meter). MET is a function of the number of humans in a building space and the activity level of each of those humans. In other words, $$MET_k = f(P_1A_1, P_2A_2, P_3A_3, \ldots P_nA_n). \quad \text{(equation 3)}$$

Where $P_n$ is a person in the space and $A_n$ is a determined activity level associated with such person.

HL is the amount of heat transfer from the skin surface, through the clothing insulation, to the outer clothing surface, and from the outer clothing surface to the environment. HL is a function of both the MET and the TSk. In other words, $$HL_k = f(MET_k, TS_k). \quad \text{(equation 4)}$$

As discussed previously, the motion detector 200 utilizes motion sensing techniques and devices to determine the number of human occupants in a building space and a measure of movement for each occupant (e.g., a rate of movement). The motion detector may also determine other variables such as the spacing between humans within the building space. This information is then passed on to the controller 108a. The controller 108a uses the data from the motion detector to calculate activity levels for each human within the building space 99. With the number of humans and their associated physical activity level determined, the controller 108a is then able to calculate MET values, as noted above. Once MET values are calculated, TS values can be calculated, as also noted above. Then, once TS values are calculated, HL values can be calculated. Finally, using the calculated MET, TS and HL values, a Predictive Mean Value ($PMV_k$) can be calculated to determine an overall thermal comfort condition for all occupants of a building space. Based on this overall thermal comfort condition, the controller 108a generates control signals for delivery to the field devices such that more cooling or heating is provided to the room 99 in accordance with the current thermal comfort condition derived by the controller 108a for the room 99.

It will be noted that the use of the ASHRAE Standard 55-1992 for determining an overall thermal comfort level may require the controller to be pre-programmed in accordance with a few assumptions. For example, some of the equations required to arrive at the PMV value require information related to the clothing level of individuals in the room 99. However, this information can be pre-programmed based on the geographic area of the building and the time of year. For example, a generally light level of clothing for all occupants of a room may be expected in Florida in the summer, while a generally heavy level of clothing can be expected in Minnesota in the winter. Various intermediate levels of clothing may be expected at locations in between at various times of the year. The controller 108a may determine the level of clothing based on an outside air temperature, weather conditions, date of the year, and geographic location of the building 98 where the controller is employed.

While the PMV as defined by ASHRAE Standard 55-1992 has been described as one exemplary method for determining an overall thermal comfort level for a room 99, it will be appreciated that numerous other methods are possible. For example, in at least one embodiment, the controller 108a may receive a number of persons in the room 99 and a rate of movement for each person from the motion detector 200. The controller 108a may then determine an activity level for each individual in a room, as described above, and associate each activity level with predicted comfort temperature taken from a lookup table stored in memory 170 (see FIG. 2B). The controller 108a may then determine that a desirable temperature level for the room is a median temperature (or mean temperature) from all the temperatures. In this embodiment, if five individuals are in a room and two of the individuals have an activity level associated with a temperature of 72° F., two have an activity level associated with 68° F., and one has an activity level associated with 70° F., the controller 108a may determine that a temperature of 70° F. (i.e., both the median and the mean in this example) would result in the best overall thermal comfort level and control the field devices accordingly. Those of ordinary skill in the art will recognize that numerous alternative methods for determining the thermal comfort level in a room (including determinations based in part on temperature and/or other environmental parameters) are also possible without departing from the scope of the present invention, as described herein.

Process Flow for BCS with Motion Detector

Figure 5:
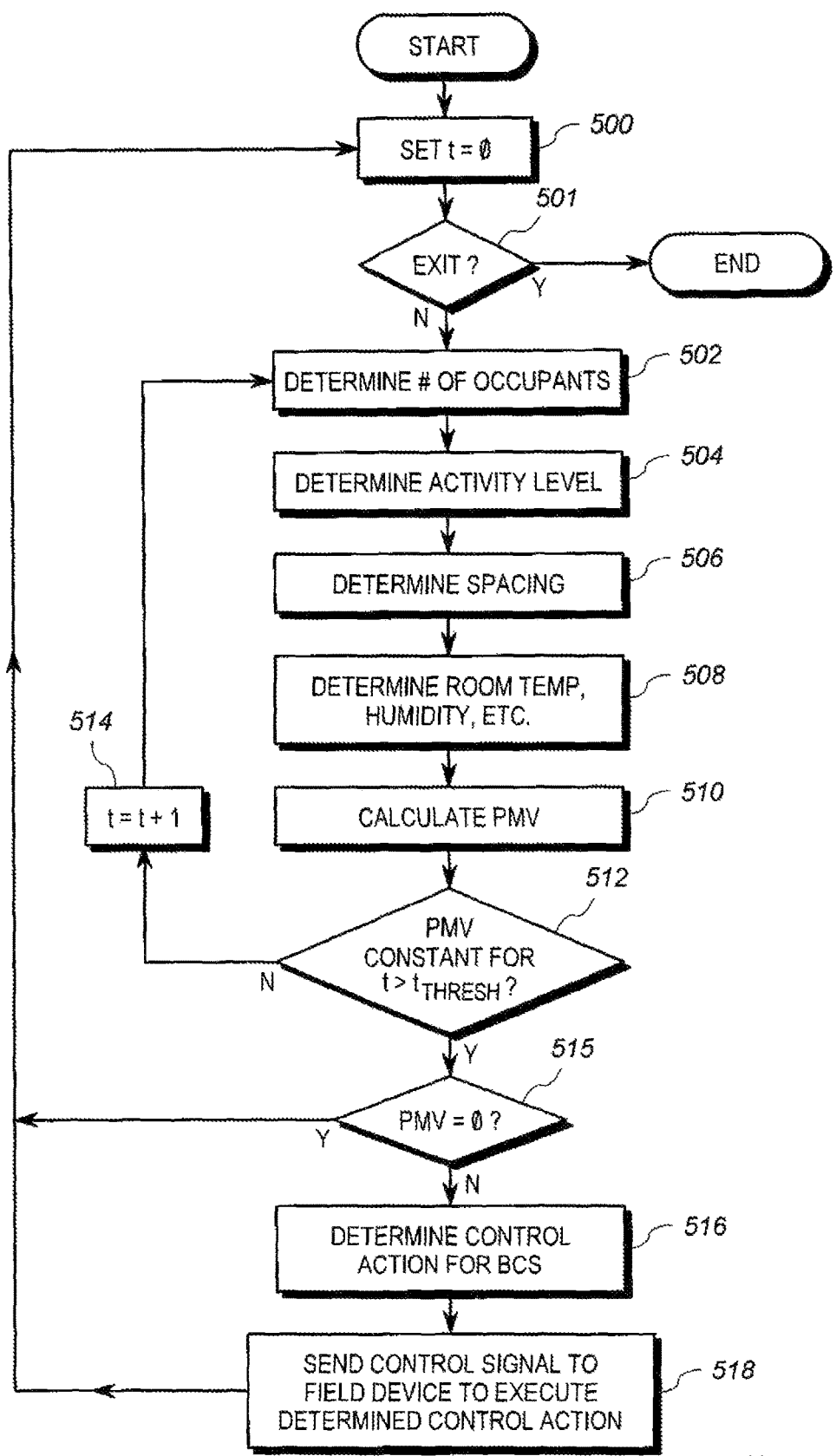
FIG. 5 is an exemplary process flow for the building automation system of FIG. 1.

Referring now to FIG. 5 an exemplary process flow performed by the temperature control application 174 (see FIG. 2B) of the temperature control system 160 is illustrated. The process begins with step 500 where a timer t is set to zero. Next, in step 501, the temperature control application 174 determines whether to exit. If the temperature control application 174 does not exit, processing continues to step 502, where the temperature control application 174 determines the number of human occupants within a building space based on data received from the motion detector 200. In different embodiments, the actual determination of the number of human occupants identified within the building space may be calculated by the processor 240 of the motion detector 200 and provided to the controller 108a, or the controller 108a may calculate the number of humans in the building space using raw data from the motion detector.

Next, in step 504, the temperature control application 174 determines an activity level for each of the identified occupants of the building space. As discussed above, the temperature control application 174 may be implemented to assign an activity level as a number ranging from zero to three, based on the number of movements of the occupant identified by the motion detector 200 over a given period of time. In the above-disclosed embodiments, the controller 108*a* calculates an activity level using measure of movement data received from the motion detector. However, it will be recognized that in other embodiments, the motion detector 200 could be configured to determine the activity level of each occupant.

In step 506, the temperature control application 174 determines the spacing between the occupants in the room. Similar to steps 502 and 504, this analysis may be performed by the processor 240 of the motion detector 200 based on data from the depth sensor and the camera 220. Alternatively, this analysis may be performed in part by the controller 108*a* based on spacing information received from the motion detector 200.

The temperature control application 174 also monitors the field devices (e.g., 409*a* of FIG. 4) or several outputs thereof to determine environmental conditions within the room 99 where the motion detector 200 is located (step 508). These environmental conditions may include temperature as well as other environmental conditions such as humidity and lighting levels.

Next, the temperature control application 174 uses the data concerning number of room occupants, activity level of the occupants, spacing of the occupants, temperature in the room, and other conditions in order to predict a thermal comfort condition in the room (step 510). In one embodiment as shown in FIG. 5, the thermal comfort condition is predicted by calculating the PMV number using the equations 1-4 depicted above. A further level of detail for equations 1-4 can be obtained in ASHRAE Standard 55-1992. As described above, the calculated PMV number may be an integer ranging from −3 to 3, with −3 being a "cold" thermal comfort condition, and 3 being a "hot" thermal comfort condition.

In step 512, the temperature control application 174 determines whether the calculated PMV has remained the same for some threshold time (e.g., 2 minutes). The threshold time, $t_{THRES}$, prevents the temperature control system from changing the environmental conditions in the room 99 based on temporary insignificant changes in the number of individuals in the room or the activity level in the room. For example, if a group of ten humans are gathered around a conference room table, and they decide to take a break, they may all stand and walk out of the room for a short period of time. During this time, there is no need for the temperature control system 160 to change the room temperature based on a high level of activity, or the reduced number of persons in the room. Accordingly, the threshold time keeps the temperature control system from making excessive adjustments to temperature in the room 99.

If the PMV has not remained constant for the threshold time, $t_{THRES}$, the temperature control application 174 continues processing at step 514, by incrementing the timer, and then returning to step 502. A small pause (not shown) may also be added to the processing step at 514. The temperature control application 174 then continues processing until the PMV for the room is calculated again at step 510.

Once the PMV has remained constant for at least the threshold time ($t_{THRES}$), the controller 108*a* continues processing at step 515 and determines whether the PMV value is zero. If the PMV value is zero, the thermal comfort condition is neutral, and no control actions need to be taken by the BAS 100. Accordingly, the temperature control application 174 returns to step 500, where the timer t is reset to zero. On the other hand, if the PMV value is a non-zero number, the temperature control application 174 continues processing at step 516 and determines an appropriate control action for the field devices of the temperature control system 160, based on the calculated PMV from step 510. If the PMV is zero, the temperature control application 174 may continue in a steady state and control the field devices to maintain the current temperature in the room 99. However, if the PMV is a number other than zero, the temperature control application will control the field devices in an attempt to bring the PMV value back towards zero. After determining the appropriate control action in step 516, the controller 108*a* continues processing at step 518 and delivers the control signal to the appropriate field device.

As an example of an appropriate control action that might be determined and delivered by the temperature control application 174, consider the temperature control system 160 of FIG. 4 including damper actuators 409*b* and 409*f* configured to control dampers 450*b* and 450*f* that regulates air flows 454*b* and 454*f* into the room 99. Also consider that it is a cold day in the winter season such that the heating unit of the HVAC system is turned on. If the PMV value is −3, such that the room is extremely cool to most occupants, the controller 108*a* will attempt to make the room less cool. The controller 108*a* may do this by confirming that the heating unit of the HVAC system is on and sending a control signal to the damper actuator 409*b* in order to adjust the dampers 450*b*, 450*f* to a fully open position (e.g., zero degrees), thus allowing heated air to flow into the room 99 at a maximum rate. Similarly, if the PMV value is −2, such that the room is moderately cool to most occupants, the controller 108*a* may confirm that the heating unit of the HVAC system is on and send a control signal to the damper actuator 409*b* in order to adjust the damper 450*b* to a mostly open position (e.g., thirty degrees). If the PMV value is −1, such that the room is only slightly cool to most occupants, the controller 108*a* may confirm that the heating unit of the HVAC system is on and send a control signal to the damper actuator 409*b* in order to adjust the damper 450*b* to a partially open position (e.g., sixty degrees). In each case, the temperature control application 174 determines control actions intended to make the room less cool in an attempt to return the thermal comfort condition in the room to a neutral condition (e.g., PMV=0).

Similarly consider the temperature control system 160 of FIG. 4 on another cold day in the winter season such that the heating unit of the HVAC system is turned on. However, at this time, the temperature control application 174 has determined that the PMV value is +3, such that the room is hot to most occupants. In this situation, the controller 108*a* may completely close the dampers 450*b* and 450*f* to block any flow of warm air into the room from the heating unit of the HVAC system. Warm air will then flow out of the room and into the colder environment, thus reducing the PMV value in the room over time. In this situation, the controller 108*a* may leave the dampers 450*b* and 450*f* closed until the PMV returns to a neutral condition. Should the PMV value become negative, the temperature control system 160 will then open the dampers and allow a flow of heating air to return to the room, in an attempt to bring the PMV value back to zero (i.e., a neutral thermal comfort condition).

As another example illustrating control of the field devices 409*b*, 409*f* in a room 99 based on the thermal comfort condition, consider the temperature control system 160 of FIG. 4 on a hot day in the summer season such that the cooling unit of the HVAC system is turned on. The temperature control application 174 has determined that the PMV value is +3 such that the room is hot to most occupants. In this situation, the controller 108a may confirm that the cooling unit of the HVAC system is on and send a control signal to the damper actuators 409b and 409f in order to adjust the dampers 450b and 450f to a fully open position (e.g., zero degrees). If the PMV value is +2, such that the room is warm to most occupants, the controller 108a may confirm that the cooling unit of the HVAC system is on and send a control signal to the damper actuator 409b in order to adjust the damper 450b to a mostly open position (e.g., thirty degrees). If the PMV value is +1, such that the room is only slightly warm to most occupants, the controller 108a may confirm that the cooling unit of the HVAC system is on and send a control signal to the damper actuator 409b in order to adjust the damper 450b to a partially open position (e.g., sixty degrees). It will be recognized that the foregoing examples are only a few of the numerous possible situations and related control actions that may be taken by the temperature control system 160 in order to control the field devices in an attempt to drive the calculated PMV value for the room to zero.

After delivering the appropriate control signal in step 518, the controller 108a continues processing at step 520, and resets the timer to zero. The controller then continues processing to step 502, where calculation of a current PMV for the room 99 begins again.

It will be recognized that various alternative methods for controlling the field devices are possible in addition to or in lieu of the method of FIG. 5. For example, in one alternative embodiment, the room 99 may include two or more damper actuators associated with different air ducts. FIG. 4 illustrates such an arrangement where two air ducts 452b and 452f are configured to deliver two different air flows 454b and 454f into the room 99. A first damper actuator 409b controls the position of the damper 450b in the first air duct 452b, and a second damper actuator 409f controls the position of the damper 450f in the second air duct. Both the first damper actuator 409b and the second damper actuator 409f are controlled by controller 108a. In this embodiment, the temperature control application 174 is configured to control the rates of air flow 454b and 454f into the room 99 such that one portion of the room receives a higher air flow rate than another portion of the room. For example, in FIG. 4, the human 400e in the right hand portion 99a of the room is very active (e.g., human 400e is participating in aerobic exercise by running on the treadmill 434). At the same time, the individuals 400a-d in the left hand portion 99b of the room are more sedentary (e.g., humans 400a-c are sitting and human 400d is standing). Accordingly, the controller 108a may be configured to control the damper actuator 409b such that air flow 454b is delivered at a higher flow rate to the portion 99a of the room where the more active individual 400e is located. The controller 108a may be further configured to control the damper actuator 409f such that air flow 454f is delivered at a lower flow rate to the portion 99b of the room where the less active individuals 400a-d are located.

While the temperature control application 174 has been described as being implemented as software executed by processing circuitry 108a (i.e., as a combination of hardware and software), it will be recognized that the embodiments presented may be implemented in hardware alone such as in an application-specific integrated circuit ("ASIC") device.

The foregoing detailed description of one or more embodiments of the arrangement for building automation system control with motion sensing has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An arrangement configured to control an environmental parameter in a building space, the arrangement comprising:
   a building automation system including at least one field device configured to control the environmental parameter within the building space; and
   a motion detector configured to detect a plurality of humans within the building space and to determine a measurement of movement for each of the detected humans;
   wherein the building automation system is configured to:
      determine a respective comfort level for each respective detected human based at least in part on the measurements of movement for the detected humans;
      determine an overall thermal comfort level based at least in part on the determined comfort levels for the detected humans; and
      control the at least one field device based at least in part on the determined overall comfort level.

2. The arrangement of claim 1, wherein the environmental parameter is a temperature in the building space, wherein the determined comfort levels correspond to comfort temperatures.

3. The arrangement of claim 1, wherein the building automation system is configured to determine the overall thermal comfort level for the building space based on a median or mean of the determined comfort levels.

4. The arrangement of claim 3, wherein the motion detector includes a camera, wherein the motion detector includes a motion sensing processor configured to send signals to a controller of the building automation system.

5. The arrangement of claim 1, wherein the motion detector includes an infrared light emitter.

6. The arrangement of claim 1, wherein the building automation system is configured to determine an activity level for each of the detected humans based on the measurements of movement determined by the motion detector that correspond to rates of movement, and wherein the building automation system is configured to control the at least one field device based at least in part on the determination which is based on at least two different activity levels for the detected humans.

7. The arrangement of claim 6, wherein the determined comfort level are based at least in part on the determined activity levels for the detected humans.

8. The arrangement of claim 7, wherein the building automation system is configured to control the at least one field device to maintain a neutral thermal comfort condition.

9. The arrangement of claim 1, wherein the motion detector is configured to determine a spacing between at least two humans that are detected within the same building space at the same time, and wherein the building automation system is configured to control the at least one field device based at least in part on the spacing between the detected at least two humans.

10. The arrangement of claim 1, wherein the building automation system is configured to control the at least one field device based at least in part on a clothing level of the detected humans, wherein the clothing level is determined based at least in part on a date and location.

11. The arrangement of claim 1, wherein the motion detector is configured to determine a portion of the building space in which the detected humans are located, and wherein the building automation system is configured to control different field devices depending at least in part on the portion of the building space in which the detected humans are located.

12. The arrangement of claim 11, wherein the field devices include a first damper actuator configured to regulate air flow to a first portion of the building space and a second damper actuator configured to regulate air flow to a second portion of the building space, and wherein the building automation system controls the first damper actuator differently from the second damper actuator depending at least in part on the portion of the building space in which the detected humans are located.

13. The arrangement of claim 1, wherein the building space is less than half the space within a room of a building.

14. A method of controlling an environmental parameter in a building space, the method comprising:
through operation of a building automation system:
detecting a plurality of humans in the building space;
determining an activity level of each of the detected humans that are in the building space;
determining a respective comfort level for each respective detected human based at least in part on the determined activity levels of the detected humans;
determining an overall thermal comfort level for the building space based at least in part on the determined comfort levels; and
controlling an operation of at least one field device of the building automation system based at least in part on the determined overall thermal comfort level.

15. The method of claim 14, further comprising through operation of the building automation system, determining the spacing of the detected humans, wherein controlling the operation of the at least one field device is based at least in part on the determined spacing of the detected humans.

16. The method of claim 14, further comprising through operation of the building automation system, determining the overall thermal comfort level for the building space based on a median or mean of the determined comfort levels.

17. The method of claim 14, wherein controlling the operation of the at least one field device includes changing the operation of the at least one field device if the determined overall thermal comfort level changes from a first state to a second state and remains in the second state for a predetermined period of time.

18. The method of claim 14 wherein the environmental parameter includes a temperature in the building space, wherein the determined comfort levels correspond to comfort temperatures.

19. A control system for a building comprising:
a motion detector configured to detect a plurality of humans and to determine a measurement of movement for each of the detected humans in a room of the building;
at least one field device configured to control a flow of air into the room of the building; and
a controller configured to receive data from the motion detector related to the detected humans and the determined measurements of movement for the detected humans, the controller further configured to determine an activity level for each of the detected humans based on the respective measurement of movement for each of the detected humans, the controller further configured to determine a respective comfort level for each respective detected human based at least in part on the determined activity levels for the detected humans, the controller further configured to determine an overall thermal comfort level based at least in part on the determined comfort levels, and the controller further configured to send control signals to the at least one field device based at least in part on the determined overall thermal comfort level.

20. The control system of claim 19, wherein the determined comfort levels correspond to comfort temperatures.

21. The control system of claim 19, wherein the controller is configured to determine the overall thermal comfort level for the room based on a median or mean of the determined comfort levels.

* * * * *